(12) United States Patent
Huang

(10) Patent No.: US 9,218,088 B2
(45) Date of Patent: Dec. 22, 2015

(54) TOUCH SCREEN DISPLAY APPARATUS

(71) Applicant: Shanghai Tianma Micro-Electronics Co., Ltd., Shanghai (CN)

(72) Inventor: Zhongshou Huang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 136 days.

(21) Appl. No.: 13/972,833

(22) Filed: Aug. 21, 2013

(65) Prior Publication Data

US 2014/0104205 A1   Apr. 17, 2014

Related U.S. Application Data

(63) Continuation of application No. PCT/CN2012/086141, filed on Dec. 7, 2012.

(30) Foreign Application Priority Data

Oct. 11, 2012   (CN) .......................... 2012 1 0385135

(51) Int. Cl.
*G06F 3/041*   (2006.01)
*G06F 3/044*   (2006.01)

(52) U.S. Cl.
CPC .............. *G06F 3/0416* (2013.01); *G06F 3/044* (2013.01)

(58) Field of Classification Search
None
See application file for complete search history.

(56) References Cited

U.S. PATENT DOCUMENTS

2006/0256093 A1* 11/2006 Furukawa et al. ............ 345/173
2010/0302202 A1* 12/2010 Takeuchi et al. .............. 345/174
2011/0012880 A1*  1/2011 Tanaka et al. ................. 345/211

FOREIGN PATENT DOCUMENTS

| CN | 1487347 A | 4/2004 |
| CN | 101154342 A | 4/2008 |
| CN | 101510136 A | 8/2009 |
| JP | 2009-192306 A | 8/2009 |
| KR | 10-2008-0029796 A | 4/2008 |

OTHER PUBLICATIONS

Office Action for Korean Application No. 10-20137026988, mailed on Apr. 25, 2015, 4 pages total.

* cited by examiner

*Primary Examiner* — Kenneth B Lee, Jr.
(74) *Attorney, Agent, or Firm* — Alston & Bird LLP

(57) ABSTRACT

The present invention provides a touch screen display apparatus including a touch structure. The touch structure includes multiple driving lines arranged in a column direction, multiple sensing lines arranged in a row direction, a preamplifier, a frequency outputter, a first shift register, and a second shift register. The first shift register is arranged between the driving lines and the frequency outputter, and the second shift register is arranged at output ends of the sensing lines. Each driving line outputs a driving signal and each sensing line outputs a sensing signal for the preamplifier. Accordingly, a single preamplifier may be used.

14 Claims, 5 Drawing Sheets

\# TOUCH SCREEN DISPLAY APPARATUS

CROSS-REFERENCES TO RELATED APPLICATIONS

This application claims priority to and is a continuation of PCT/CN2012/086141, filed on Dec. 7, 2012 and entitled "TOUCH SCREEN DISPLAY APPARATUS", which application claims the benefit of Chinese Patent Application No. 201210385135.5, filed with the Chinese Patent Office on Oct. 11, 2012 and entitled "TOUCH SCREEN DISPLAY APPARATUS", the contents of which are incorporated herein by reference in their entirety.

FIELD OF THE INVENTION

The present invention relates to the field of touch screen technologies and particularly to a touch screen display apparatus.

BACKGROUND OF THE INVENTION

Touch screens can be generally categorized into resistive touch screens and capacitive touch screens.

Capacitive touch screens can be categorized according to touch signal detection technology as self-capacitive and mutual-capacitive touch screens.

FIG. 1 illustrates an equivalent circuit of a typical mutual-capacitive touch screen in the related art, and referring to FIG. 1, a mutual-capacitive touch screen is consisted of multiple driving lines (e.g., Y1-Y4) and multiple sensing lines (e.g., X1-X4) intersecting perpendicularly. There is a sub-pixel of the touch screen in the dotted box. Capacitance of an overlapping part between a driving line and a sensing line is invariable by an object touching the screen, but the capacitance of the overlapping part may output stable background noise or a direct current component to a preamplifier A. Mutual-capacitance Cm formed by a space edge electric field arising from a non-overlapping part between the driving line and the sensing line is influenced directly by the touch of the object from the outside.

Referring to FIG. 1, an operation principle of the mutual-capacitive touch screen can be summarized as follows: a driving signal at a specific frequency is input to one end of each of the multiple driving lines, and one end of each of the multiple sensing lines is connected to one of the preamplifiers A which receives and amplifies a sensing signal of the mutual-capacitance Cm. When a finger touches the surface of the touch screen, for example, at the location T illustrated in FIG. 1, a part of current flows into the finger, which is equivalent to a change in the mutual-capacitance Cm between the driving line and the sensing line, and the signal that can be received by the preamplifier A is attenuated. The specific touch location T of the finger can be detected by detecting the change in signal on the respective sensing lines.

As is apparent from FIG. 1, the driving signal is respectively transmitted to each driving line through a scan drive circuit, and the signal output from each sensing line is amplified and output by the preamplifier.

FIG. 2 is a schematic structural diagram of an electrode which can be used in the mutual-capacitive touch screen illustrated in FIG. 1. Referring to FIG. 2, each sensing line X and each driving line Y is connected to the outside through a lead line. With an increasing density of pixels, there are more and smaller sensing lines and driving lines, and consequently there are more lead lines which are concentrated on the perimeter of the touch screen, thus making it more difficult to make a narrow frame. Moreover with an increasing number of driving lines, the scan drive circuit has to scan by column, thus making it more complex to implement. Furthermore there are as many preamplifiers as sensing lines, thus making the circuit structurally bulky.

BRIEF SUMMARY OF THE INVENTION

One inventive aspect is a touch screen display apparatus. The display apparatus includes a touch structure, where the touch structure has multiple driving lines arranged in a column direction, multiple sensing lines arranged in a row direction, a preamplifier, a frequency outputter, a first shift register, and a second shift register. The frequency outputter is configured to output a driving signal at a predetermined frequency, and the first shift register is configured to output the driving signal to each driving line. In addition, the second shift register is configured to output a sensing signal from each sensing line to the preamplifier, and the preamplifier is configured to output an amplified sensing signal based on the sensing signal from the second shift register.

Another inventive aspect is a touch screen display apparatus, which includes a plurality of driving lines arranged in a column direction, a plurality of sensing lines arranged in a row direction, a preamplifier, a frequency outputter, a first shift register, a plurality of first selection switches, a second shift register, and a plurality of second selection switches. The frequency outputter is configured to output a driving signal at a predetermined frequency, and the first selection switches are configured to output the driving signal to each driving line according to an output of the first shift register. In addition, the second selection switches are configured to output a sensing signal from each sensing line to the preamplifier according to an output of the second shift register, and the preamplifier is configured to output an amplified sensing signal based on the sensing signal from the second selection switches.

DETAILED DESCRIPTION OF THE INVENTION

In order to make the foregoing objects, features and advantages of the present invention more apparent, particular embodiments of the present invention will be described in detail below with reference to the drawings.

First Embodiment

Figure 1:
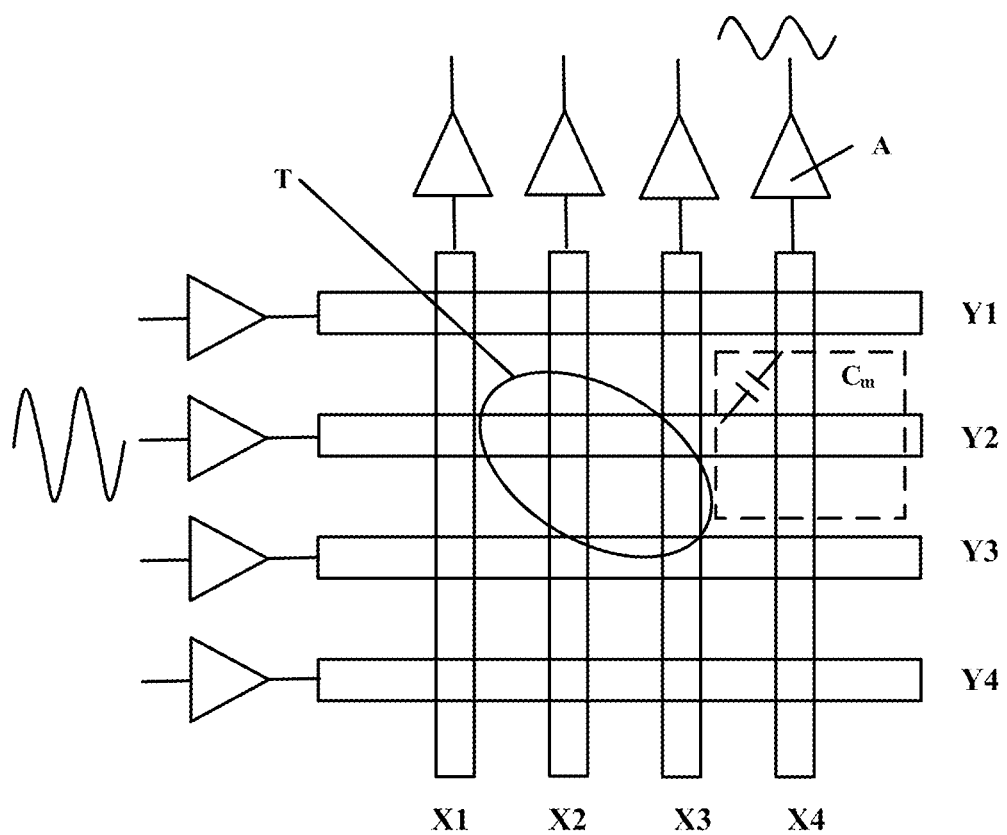
FIG. 1 illustrates an equivalent circuit of a typical mutual-capacitive touch screen in the related art.
Figure 2:
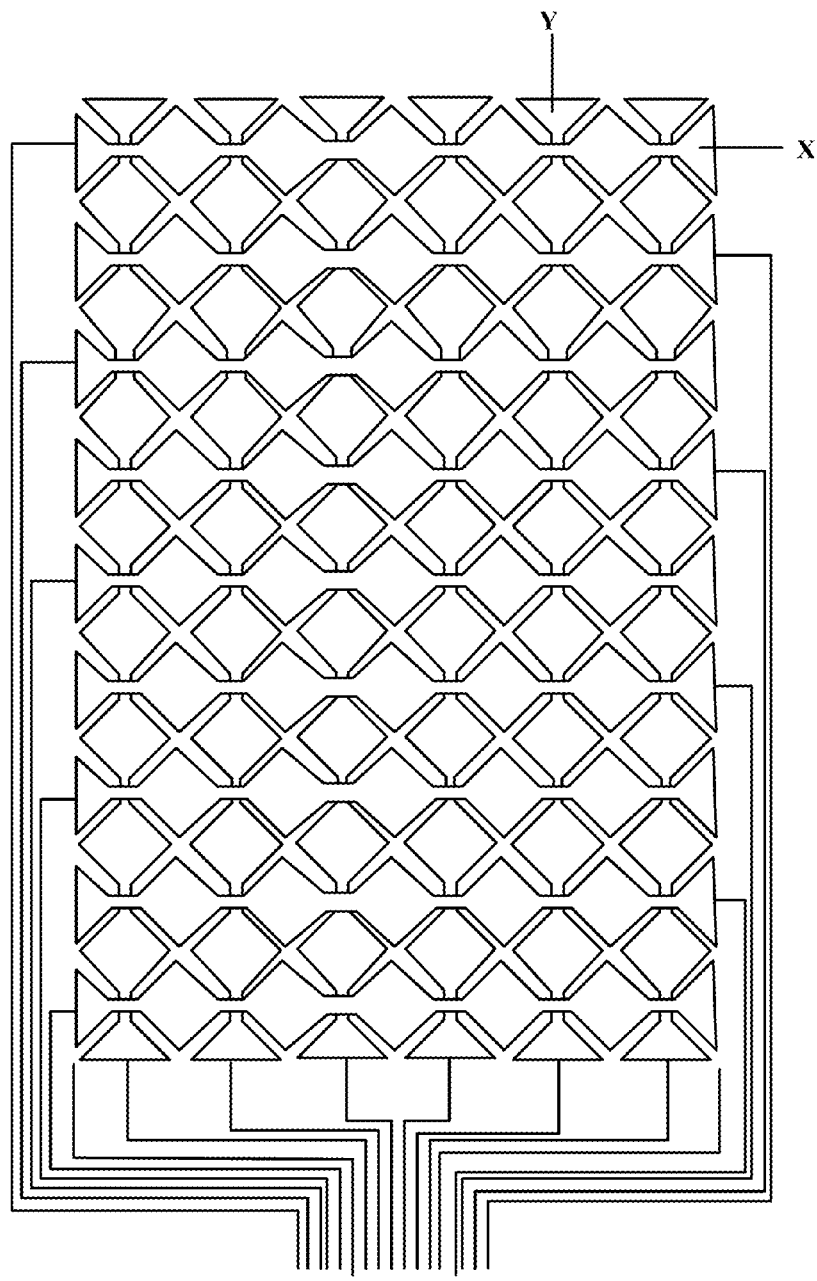
FIG. 2 is a schematic structural diagram of an electrode of the touch screen in the related art.
Figure 3:
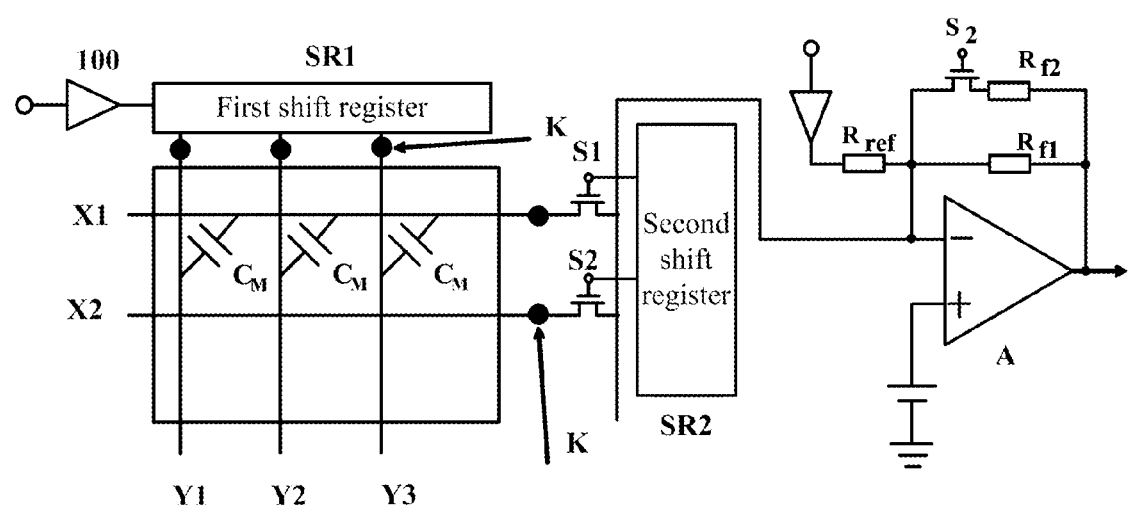
FIG. 3 is a schematic structural circuit diagram of a touch screen display apparatus according to a first embodiment of the present invention.

FIG. 3 is a schematic structural circuit diagram of a touch screen display apparatus according to a first particular embodiment of the present invention. Referring to FIG. 3, the touch screen display apparatus according to this embodiment includes a touch structure and a TFT substrate, where the touch structure includes multiple driving lines arranged in the column direction, multiple sensing lines arranged in the row direction, a preamplifier A, a frequency outputter 100, a first shift register SR1 and a second shift register SR2. FIG. 3 schematically illustrates three driving lines, Y1, Y2 and Y3 respectively, and two sensing lines, X1 and X2 respectively. It can be appreciated that the present invention is not limited to any specific numbers of driving lines and sensing lines.

The frequency outputter 100 is configured to output a driving signal at a predetermined frequency;

The first shift register SR1 is configured to output the driving signal output from the frequency outputter 100 to each driving line;

The second shift register SR2 is configured to output a sensing signal output from each sensing line to the preamplifier A; and The preamplifier A is configured to amplify the sensing signal output from the second shift register SR2 and then output.

The touch screen display apparatus according to the present invention has the first shift register SR1 arranged between the driving lines and the frequency outputter, and the second shift register SR2 arranged between the sensing lines and the preamplifier, so that each driving line outputs the driving signal column by column or driving line by driving line. As a result, the number of lead lines connected to the driving lines is reduced. Each sensing line similarly outputs a touch signal to the preamplifier. As a result, the number of lead lines connected to the sensing lines is reduced. In addition, a single preamplifier may be used. Accordingly, the number of lead lines on the perimeter of a touch screen can be lowered to narrow a frame of the touch screen.

The structure of a touch screen is introduced below in order to enable those skilled in the art to better understand the present invention.

Figure 4:
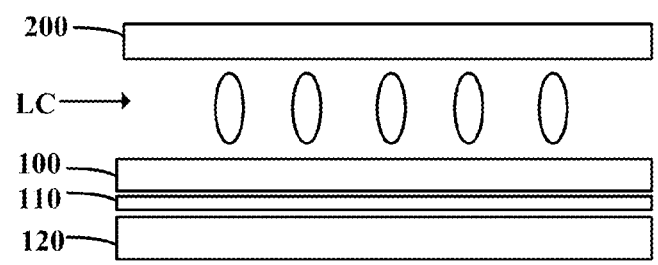
FIG. 4 is a schematic structural sectional view of the touch screen display apparatus according to the particular embodiment of the present invention.

FIG. 4 is a schematic structural sectional view of the touch screen display apparatus. Referring to FIG. 4, from the structural perspective, the touch screen display apparatus generally includes a Thin Film Transistor (TFT) substrate 100; a Color Filter (CF) substrate 200 arranged opposite to the TFT substrate 100; and Liquid Crystals (LCs) between the CF substrate 200 and the TFT substrate. A polarization mirror 110 and a backlight 120 are arranged on the back of the TFT substrate 100.

In this embodiment, the touch screen display apparatus has both the driving lines and the sensing lines fabricated on the TFT substrate. In other embodiments, either the driving lines or the sensing lines are fabricated on the CF substrate or both the driving lines and the sensing lines are fabricated on the CF substrate. The touch screen structures are referred to as inbuilt touch screen structures. That is, a touch structure is fabricated internal to a Liquid Crystal Display (LCD) apparatus.

In a particular embodiment of the present invention, the first shift register SR1 is fabricated on the TFT substrate, and the second shift SR2 is fabricated on the TFT substrate.

When the driving lines are fabricated on the CF substrate, an output end of the first shift register SR1 can be connected to a corresponding driving line through a conductive gold spacer; and when the driving lines are fabricated on the TFT substrate, the output end of the first shift register SR1 can be connected to the corresponding driving line through a via hole on the TFT substrate.

When the sensing lines are fabricated on the CF substrate, an output end of the second shift register SR2 can be connected to a corresponding sensing line through a conductive gold spacer; and when the sensing lines are fabricated on the TFT substrate, the output end of the second shift register SR2 can be connected to the corresponding sensing line through a via hole on the TFT substrate.

The first shift register and the second shift register of the present invention can be composed of amorphous silicon or Low Temperature Poly-Silicon (LTPS) and different layers of metals together, and in this embodiment, both the first shift register and the second shift register are amorphous silicon registers.

Figure 5:
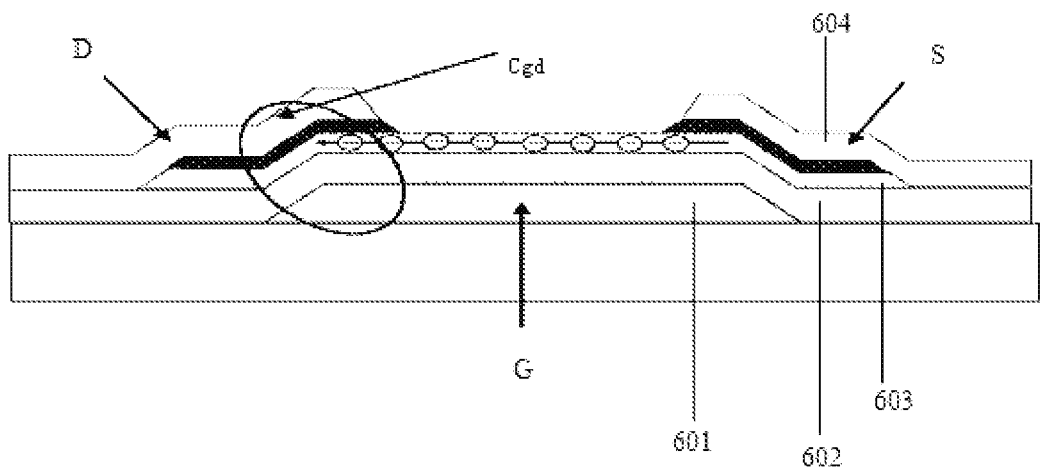
FIG. 5 is a schematic structural sectional view of an amorphous silicon shift register according to the particular embodiment of the present invention.

FIG. 5 is a schematic structural sectional view of an amorphous silicon TFT switch, and referring to FIG. 5, the TFT includes a source S, a drain D and a gate G arranged on a substrate and a capacitor Cgd between the gate G and the drain S. The source S and the drain D are formed of a source-drain metal layer 604, and the gate G is formed of a gate metal layer 601, and there are further included a gate dielectric layer 602 and an amorphous silicon layer 603 arranged between the gate metal layer 601 and the source-drain metal layer 604. A display area of the liquid crystal display apparatus includes a plurality of pixel elements, each of which may include the TFT of FIG. 5 with the drain D being electrically connected to a pixel electrode to control to the pixel element for display.

In this embodiment, both the first shift register and the second shift register are arranged in a non-display area surrounding the display area, and the first shift register, the second shift register and the TFT switches on the TFT substrate are fabricated together. That is, they are structurally constituted of the gate metal layer 601, the gate dielectric layer 602, the amorphous silicon layer 603, the source-drain metal layer 604 and a passivation layer (not illustrated) and formed during the same process steps.

The output ends of the first shift register and the second register are generally formed of the gate metal layer 601 or the source-drain metal layer 604.

A description will be given below of how to electrically connect the first shift register and the second shift register respectively with the driving lines and the sensing lines on the TFT substrate from the physically structural perspective in connection with sectional views.

Figure 6:
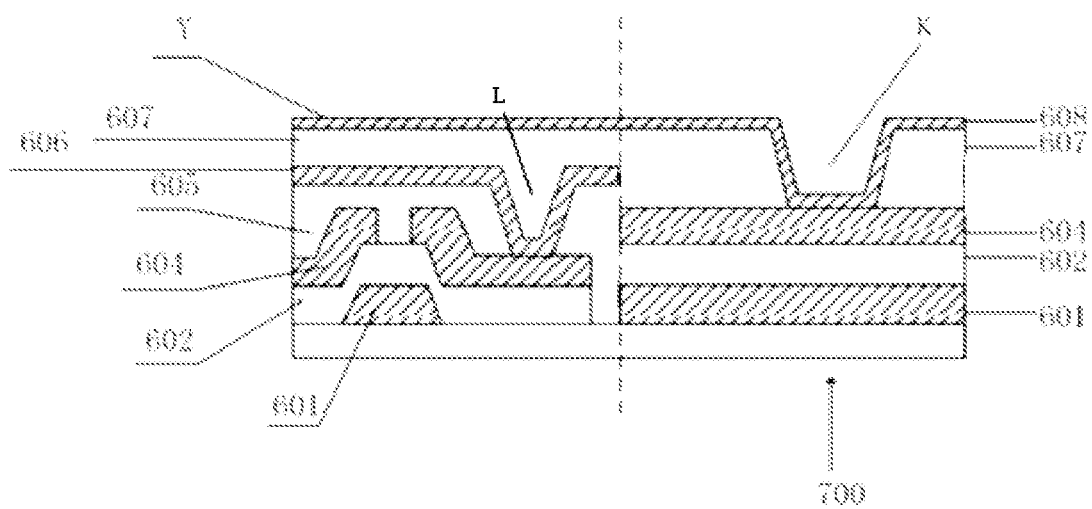
FIG. 6 is a schematic diagram of a driving line and a first shift register being connected when the driving line is fabricated on a TFT substrate and the first shift register is fabricated on the TFT substrate.

FIG. 6 is a schematic diagram of a driving line and the first shift register being connected with the driving line fabricated on the TFT substrate, where the first shift register is also fabricated on the TFT substrate. Referring to FIG. 6, a TFT switch is schematically illustrated in a display area to the left of the dotted line; and an output end of the first shift register 700 is schematically illustrated in a non-display area to the right.

The gate metal layer 601, the gate dielectric layer 602, the source-drain metal layer 604, the passivation layer 605, an pixel electrode layer 606, an insulation layer 607 and a driving line Y are arranged to be stacked on the TFT substrate in that order. In the display area, the TFT switch includes a gate on the gate metal layer 601, the gate dielectric layer 602, a semiconductor layer, a source and a drain on the source-drain metal layer 604, the passivation layer 605 and a pixel electrode on the pixel electrode layer 606, where the pixel electrode is electrically connected to the drain through a via hole L. In the non-displayer area, an output end of the first shift register 700 is formed of the source-drain metal layer 604, a via hole K is arranged through the insulation layer 607, the output end of the first shift register 700 is exposed at the bottom of the via hole K, and the driving line Y fabricated on the TFT substrate is electrically connected to the output end of the first shift register 700 through the via hole K.

Figure 7:
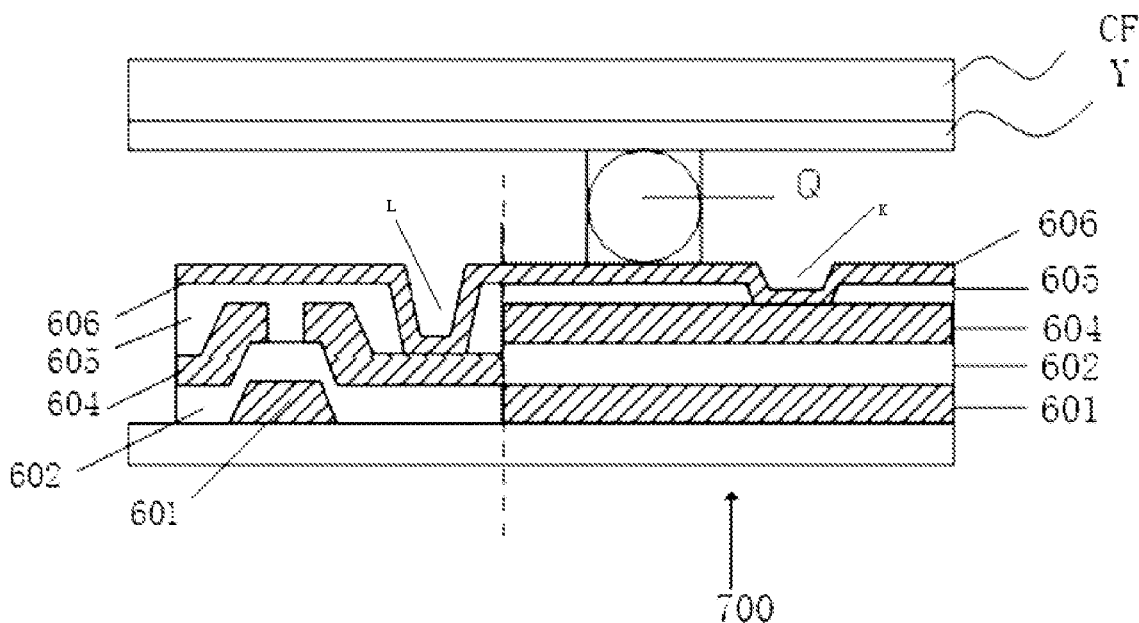
FIG. 7 is a schematic diagram of a driving line and a first shift register being connected when the driving line is fabricated on a CF substrate and the first shift register is fabricated on a TFT substrate according to a second embodiment of the present invention.

FIG. 7 is a schematic diagram of the driving line Y and the first shift register 700 being connected when the driving line Y is fabricated on the CF substrate and the first shift register 700 is fabricated on a TFT substrate. Referring to FIG. 7, a TFT switch is schematically illustrated in a display area to the left of the dotted line; and an output end of the first shift register 700 is schematically illustrated in a non-display area to the right.

The TFT substrate and the CF substrate are arranged in opposition, and the driving line Y is fabricated on the side of the CF substrate facing the TFT substrate.

The gate metal layer 601, the gate dielectric layer 602, the source-drain metal layer 604, the passivation layer 605 and the pixel electrode layer 606 are arranged to be stacked on the TFT substrate in that order. In the display area, the TFT switch includes a gate on the gate metal layer 601, the gate dielectric layer 602, a semiconductor layer, a source and a drain on the source-drain metal layer 604, the passivation layer 605 and a pixel electrode on the pixel electrode layer 606, where the pixel electrode is electrically connected to the drain through a via hole L. In the non-displayer area, an output end of the first shift register 700 is formed of the source-drain metal layer 604, a via hole K is arranged through the passivation layer 605, the output end of the first shift register 700 is exposed at the bottom of the via hole K, and then an electrically conductive layer is fabricated on the pixel electrode layer 606 to be electrically connected to the output end formed of the source-drain metal layer 604 below the via hole K and to take its signal onto the electrically conductive layer. Then an electrically conductive adhesive including a conductive gold spacer Q is arranged on the electrically conductive layer to be electrically connected to the driving line Y on the CF substrate.

Preferably the touch screen display apparatus according to this embodiment further includes at least one selection switch as illustrated in FIG. 3 by way of an example, where the number of selection switches connected to the sensing lines is the same as the number of sensing lines.

One of the selection switches is connected in series to an output end of each sensing line, e.g., a selection switch S1 connected in series to a sensing line X1 and a selection switch S2 connected in series to a sensing line X2. The output end of the second shift register SR2 is electrically connected respectively to a control end of each selection switch, the output end of the sensing line is electrically connected to a first end of the selection switch, and a second end of the selection switch is electrically connected to an inverting input of the preamplifier A.

The selection switches are arranged on the TFT substrate; and when the sensing lines are fabricated on the CF substrate, the output end of each sensing line is electrically connected to the first end of the selection switch through a conductive gold spacer; and when the sensing lines are fabricated on the TFT substrate, the output end of each sensing line is electrically connected to the first end of the selection switch through a via hole on the TFT substrate.

It shall be noted that the output ends of the driving lines may be similarly connected in series to selection switches, where the number of selection switches connected to the driving lines is the same as the number of driving lines. Those skilled in the art can undoubtedly conclude how to connect in the physical structure the first shift register, the driving lines and the selection switches according to the physical structure of the connections of the second shift register and the sensing lines. Selections switches and connections between the selection switches and a shift register may be included in the first shift register SR1, and a repeated description thereof will be omitted here.

Typically in the touch screen display apparatus, the TFT substrate is arranged with scanning lines electrically connected to a shift register to improve a scan timing signal, and thus in this invention, the first shift register and the shift register eclectically connected to the scanning lines can be the same one, that is, the scanning lines and the driving lines may share the same first shift register. Alternatively, the second shift register and the shift register electrically connected to the scanning lines can be the same one. That is, the scanning lines and the sensing lines share the same second shift register.

It can be appreciated that since a TFT-LCD has a different resolution from that of a touch screen and includes more scanning lines than driving lines and sensing lines, there are more output lines of the shift register connected to the scanning lines. Thus, when the driving lines and the sensing lines share the shift register with the scanning lines, there are redundant output lines of the shift register for the driving lines and the scanning lines. As such, one of every N output lines in the shift register can be connected to a driving line of the touch screen, where N is an integer of 2 or above, and N is the ratio of the number of scanning lines to the number of driving lines. For example, if there are 600 scanning lines and 30 driving lines, and then one of every 20 output lines of the shift register is connected to a driving line. Similarly, one of every Z output lines in the shift register can be connected to a sensing line of the touch screen, where Z is an integer of 2 or above, and Z is the ratio of the number of scanning lines to the number of sensing lines. For example, there are 600 scanning lines and 20 sensing lines, and then one of every 30 output lines of the shift register is connected to a sensing line.

Second Embodiment

Figure 8:
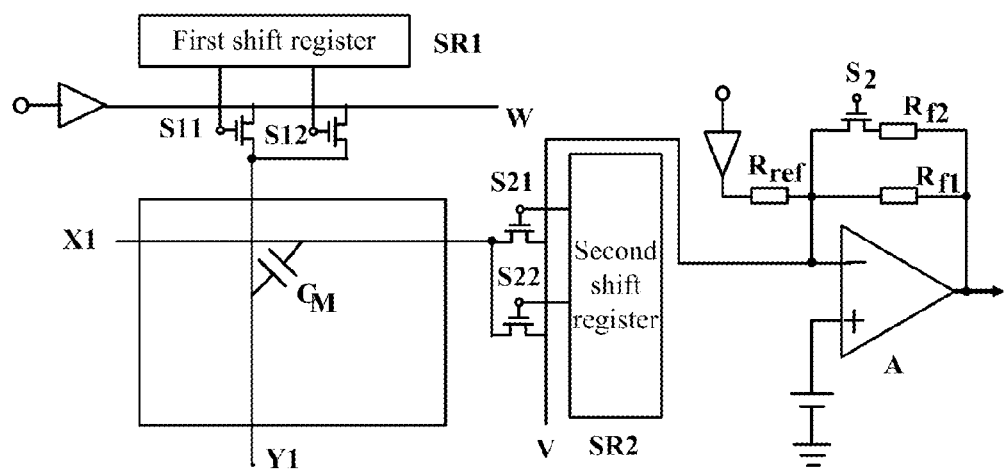
FIG. 8 is a schematic structural circuit diagram of a touch screen display apparatus according to the second embodiment of the present invention.

FIG. 8 is a schematic structural circuit diagram of a touch screen display apparatus according to a second embodiment of the present invention, and referring to FIG. 8, the second embodiment differs from the first embodiment in that:

M first selection switches are connected in parallel between each driving line and an input driving signal bus bar. In this embodiment, the selection switches have first ends connected to the driving line Y1 and second ends connected to the input driving signal bus bar W. In addition, control ends of the first selection switches are connected to the output ends of the first shift register, where M is an integer of 2 or above. The first selection switches can be TFT switches.

P second selection switches are connected in parallel between each sensing line and an output data bus bar. In this embodiment, the second selection switches have first ends connected to the sensing line Xl and second ends connected to the output data bus bar V. In addition, control ends of the second selection switches are connected to the output ends of the second shift register, where P is an integer of 2 or above. The second selection switches can be TFT switches.

A detailed description will be given below with reference to FIG. 8 in order to enable those skilled in the art to more clearly understand and practice the technical solution according to this embodiment.

In FIG. 8, only one driving line Y1 and one sensing line X1 are illustrated together with M being 2 and P being 2 by way of an example. As can be appreciated, FIG. 8 illustrates only two output lines in the shift register being connected to the same driving line or sensing line. Thus the problem of a non-uniform load on output lines of the shift register can be solved.

Two first selection switches, S11 and S12 are respectively connected in parallel between a driving line Y1 and an input driving signal bus bar W. Control ends of S11 and S12 are connected respectively to two output lines of the first shift register SR1.

Two second selection switches, S21 and S22 are respectively connected in parallel between a sensing line X1 and an output data bus bar V. Control ends of S21 and S22 are connected respectively to two output lines of the second shift register SR2.

It shall be noted that FIG. 8 illustrates only two output lines of the shift register being connected to the same driving line or sensing line by way of an example. As can be appreciated, the number of output lines of the shift register and the number of selection switches can be set as needed in practice in a particular implementation process.

As can be appreciated, a pulse signal is output on output lines of the shift register, and when a plurality of output lines of the first or second shift register are connected to a plurality of driving lines or sensing lines through the first selection switches or the second selection switches, the driving lines or sensing lines are active for a longer period of time than that of the scanning lines. In FIG. 8, for example, two output lines are connected concurrently to the same driving line. The driving line Y1 is, therefore, active for a period of time as a result of integrating high levels of pulse signals on these two output lines. For example, a pulse signal on each output line is at a high level for a period of time 2 µs, and there is a 4 µs high level as a result of integrating the high levels of the pulse signals on the two output lines. That is, the driving line Y1 is enabled for a 4 µs period of time. The same applies to a period of time for which the sensing lines are enabled, and a repeated description thereof will be omitted here.

In the touch screen display apparatus according to the foregoing embodiment, the preamplifier further includes a feedback network including at least two feedback branches connected in parallel, where one of the feedback branches includes a resistor, and the other feedback branch includes a resistor and a switch connected in series, and the feedback network has its resistance changed by controlling the switch to be closed and opened.

Referring to FIG. 8, the feedback network included in the preamplifier A includes two feedback branches, where the first feedback branch includes a first resistor Rf1, and the second feedback branch includes a second resistor Rf2 and a first switch Sf2 connected in series. When the first switch Sf2 is closed, the feedback network includes two resistors connected in parallel (the first resistor Rf1 and the second resistor Rf2); and when the first switch Sf2 is opened, the feedback network includes the first resistor Rf1. That is, the feedback network has its resistance changed by controlling the first switch Sf2 to be closed and opened.

The preamplifier further includes a compensation network including a compensation resistor Rref through which the inverting input of the preamplifier is connected to a compensation signal source.

The compensation network is primarily for the purpose of compensating an output signal of the preamplifier when there is no signal input to the sensing lines of the touch screen so as to prevent a signal from the output end of the preamplifier, which would otherwise have resulted in a false positive of a sensing signal for the touch screen.

It shall be noted that the touch screen display apparatuses according to the foregoing embodiments can be applicable to both a capacitive touch screen and a resistive touch screen.

The foregoing description is merely illustrative of certain embodiments of the present invention. Although the present invention has been disclosed in these embodiments discussed, these embodiments are not intended to limit the present invention. Any skilled in the art can make numerous possible variations and modifications to the technical solution of the present invention or modify the technical solution of the present invention to equivalent embodiments with equivalent variations according to the method and technical disclosure above without departing from the scope of the technical solution of the present invention. Accordingly any apparent modifications, equivalent variations and alternations made to the foregoing embodiments in light of the technical essence of the present invention without departing from the disclosure of the technical solution of the present invention shall come into the claimed scope of the technical solution of the present invention.

What is claimed is:

1. A touch screen display apparatus, comprising a touch structure, wherein the touch structure comprises:
   multiple driving lines arranged in a column direction,
   multiple sensing lines arranged in a row direction,
   a preamplifier,
   a frequency outputter,
   a first shift register, and
   a second shift register, wherein the frequency outputter is configured to output a driving signal at a predetermined frequency, wherein the first shift register is configured to output the driving signal to each driving line, wherein the second shift register is configured to output a sensing signal from each sensing line to the preamplifier, and wherein the preamplifier is configured to output an amplified sensing signal based on the sensing signal from the second shift register;
   wherein M first selection switches are connected in parallel between each driving line and an input driving signal bus bar, and wherein the first selection switches each have a first end connected to the driving line, a second end connected to the input driving signal bus bar, and a control end connected to output ends of the first shift register, wherein M is an integer of 2 or above; and/or
   wherein P second selection switches are connected in parallel between each sensing line and an output data bus bar, and wherein the second selection switches each have a first end connected to the sensing line and a second end connected to the output data bus bar, and a control end connected to output ends of the second shift register, wherein P is an integer of 2 or above.

2. The touch screen display apparatus according to claim 1, further comprising a TFT substrate on which the first shift register and the second shift register are fabricated.

3. The touch screen display apparatus according to claim 2, further comprising a CF substrate, wherein the driving lines are fabricated on the CF substrate or the TFT substrate, and the sensing lines are fabricated on the CF substrate or the TFT substrate.

4. The touch screen display apparatus according to claim 3, wherein the driving lines are fabricated on the CF substrate, and an output end of the first shift register is connected to a corresponding driving line through a conductive gold spacer, or the driving lines are fabricated on the TFT substrate, and the output end of the first shift register is connected to the corresponding driving line through a via hole on the TFT substrate.

5. The touch screen display apparatus according to claim 3, wherein the sensing lines are fabricated on the CF substrate, and an output end of the second shift register is connected to a corresponding sensing line through a conductive gold spacer, or the sensing lines are fabricated on the TFT substrate, and the output end of the second shift register is connected to the corresponding sensing line through a via hole on the TFT substrate.

6. The touch screen display apparatus according to claim 2, wherein a plurality of scanning lines are arranged on the TFT substrate to be electrically connected to one of the first shift register and the second shift register.

7. The touch screen display apparatus according to claim 6, wherein one of every N output lines in the first shift register is connected to a corresponding driving line, or one of every Z output lines in the second shift register is connected to a corresponding sensing line, and wherein N is an integer of 2 or above, and Z is an integer of 2 or above.

8. The touch screen display apparatus according to claim 7, wherein N is the ratio of the number of scanning lines to the number of driving lines, and Z is the ratio of the number of scanning lines to the number of sensing lines.

9. The touch screen display apparatus according to claim 1, wherein the first shift register and the second shift register comprise amorphous silicon or low temperature poly-silicon or indium gallium zinc oxide.

10. The touch screen display apparatus according to claim 1, wherein the preamplifier further comprises a feedback network, wherein the feedback network comprises at least two feedback branches connected in parallel, wherein one of the feedback branches comprises a resistor, and the other feedback branch comprises a resistor and a switch connected in series, and wherein the feedback network has its resistance changed by controlling the switch.

11. The touch screen display apparatus according to claim 10, wherein the preamplifier further comprises a compensation network, and wherein the compensation network comprises a compensation resistor through which an inverting input of the preamplifier is connected to a compensation signal source.

12. A touch screen display apparatus, comprising:
a plurality of driving lines arranged in a column direction;
a plurality of sensing lines arranged in a row direction;
a preamplifier;
a frequency outputter;
a first shift register;
a plurality of first selection switches;
a second shift register; and
a plurality of second selection switches,
wherein the frequency outputter is configured to output a driving signal at a predetermined frequency, wherein the first selection switches are configured to output the driving signal to each driving line according to an output of the first shift register, wherein the second selection switches are configured to output a sensing signal from each sensing line to the preamplifier according to an output of the second shift register, and wherein the preamplifier is configured to output an amplified sensing signal based on the sensing signal from the second selection switches;
wherein M first selection switches are connected in parallel between each driving line and an input driving signal bus bar, and wherein the first selection switches each have a first end connected to the driving line, a second end connected to the input driving signal bus bar, and a control end connected to output ends of the first shift register, wherein M is an integer of 2 or above; and/or
wherein P second selection switches are connected in parallel between each sensing line and an output data bus bar, and wherein the second selection switches each have a first end connected to the sensing line and a second end connected to the output data bus bar, and a control end connected to output ends of the second shift register, wherein P is an integer of 2 or above.

13. The touch screen display apparatus according to claim 12, further comprising a TFT substrate on which the first shift register and the second shift register are fabricated.

14. The touch screen display apparatus according to claim 12, wherein the preamplifier further comprises a feedback network, wherein the feedback network comprises at least two feedback branches connected in parallel, wherein one of the feedback branches comprises a resistor, and the other feedback branch comprises a resistor and a switch connected in series, and wherein the feedback network has its resistance changed by controlling the switch.

* * * * *